(12) United States Patent
Derrien et al.

(10) Patent No.: US 9,381,676 B2
(45) Date of Patent: Jul. 5, 2016

(54) METHOD FOR PLACING AN OVEN FOR HEAT-TREATING PREFORMS ON STANDBY

(75) Inventors: Mikael Derrien, Octeville sur Mer (FR); Pascal Bernier, Octeville sur Mer (FR); Laurent Danel, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 451 days.

(21) Appl. No.: 13/877,396

(22) PCT Filed: Oct. 6, 2011

(86) PCT No.: PCT/EP2011/067429
§ 371 (c)(1),
(2), (4) Date: Apr. 2, 2013

(87) PCT Pub. No.: WO2012/049061
PCT Pub. Date: Apr. 19, 2012

(65) Prior Publication Data
US 2013/0195431 A1    Aug. 1, 2013

(30) Foreign Application Priority Data
Oct. 11, 2010 (FR) ...................................... 10 58214

(51) Int. Cl.
*F24H 7/00* (2006.01)
*B29B 13/02* (2006.01)
(Continued)

(52) U.S. Cl.
CPC ............. *B29B 13/02* (2013.01); *B29C 49/6418* (2013.01); *B29C 49/78* (2013.01); *B29C 49/68* (2013.01); *B29C 2035/0822* (2013.01)

(58) Field of Classification Search
CPC ............ B29B 13/02; B29C 2035/0822; B29C 49/6418; B29C 49/68; B29C 49/78
USPC ................... 392/340; 432/10, 11, 21, 24, 42; 425/174.4, 144, 526; 264/37.1, 40.1, 264/40.6, 535, 521
See application file for complete search history.

(56) References Cited

U.S. PATENT DOCUMENTS 5,322,651 A * 6/1994 Emmer ......................... 264/410
5,418,369 A * 5/1995 Moore et al. .................. 250/372
(Continued)

FOREIGN PATENT DOCUMENTS

CN     1190925        8/1998
DE     102006049163   5/2008
(Continued)

OTHER PUBLICATIONS

International Search Report, dated Nov. 8, 2011, from corresponding PCT application.
(Continued)

*Primary Examiner* — Dana Ross
*Assistant Examiner* — Joseph Iskra
(74) *Attorney, Agent, or Firm* — Young & Thompson

(57) ABSTRACT

A method for placing an oven (12) for heat-treating preforms (13) into standby, including: a device (16) for conveying the preforms (13); at least one heating lamp (22); at least one heat-accumulation element (24, 26); and an electronic unit for controlling the heating lamps (22), characterized in that the method includes, in series: a first switching-off step (E1) which is triggered when a stop in production is determined, and in which the heating lamps (22) are completely switched off; and then a second temperature-maintaining step (E2) which is triggered after the first step (E1), and in which the heating lamps (22) are activated at a predetermined intensity in order to reheat the accumulation elements (24, 26).

20 Claims, 1 Drawing Sheet

(51) Int. Cl.
  *B29C 49/64* (2006.01)
  *B29C 49/78* (2006.01)
  *B29C 49/68* (2006.01)
  *B29C 35/08* (2006.01)

(56) References Cited

U.S. PATENT DOCUMENTS

| | | | |
|---|---|---|---|
| 5,876,768 | A | 3/1999 | Collombin |
| 6,632,087 | B1 * | 10/2003 | Armellin et al. ............... 432/202 |
| 8,980,162 | B2 | 3/2015 | Haesendonckx et al. |
| 2007/0220835 | A1 | 9/2007 | Till |
| 2010/0225029 | A1 * | 9/2010 | Senn ............................ 264/492 |
| 2011/0260372 | A1 | 10/2011 | Hahn |

FOREIGN PATENT DOCUMENTS

| | | |
|---|---|---|
| DE | 10 2008 021527 A1 | 11/2009 |
| EP | 1 837 157 A2 | 9/2007 |
| FR | 2 890 891 A1 | 3/2007 |
| JP | H09-76338 | 3/1997 |
| WO | 97/03805 A1 | 2/1997 |

OTHER PUBLICATIONS

CN Office Action, dated Aug. 18, 2014; Application No. 201180056551.4.

* cited by examiner

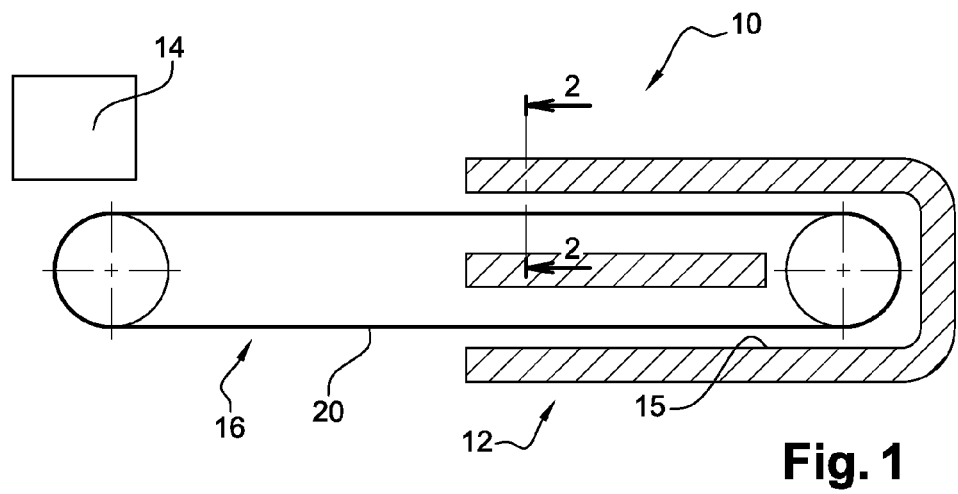
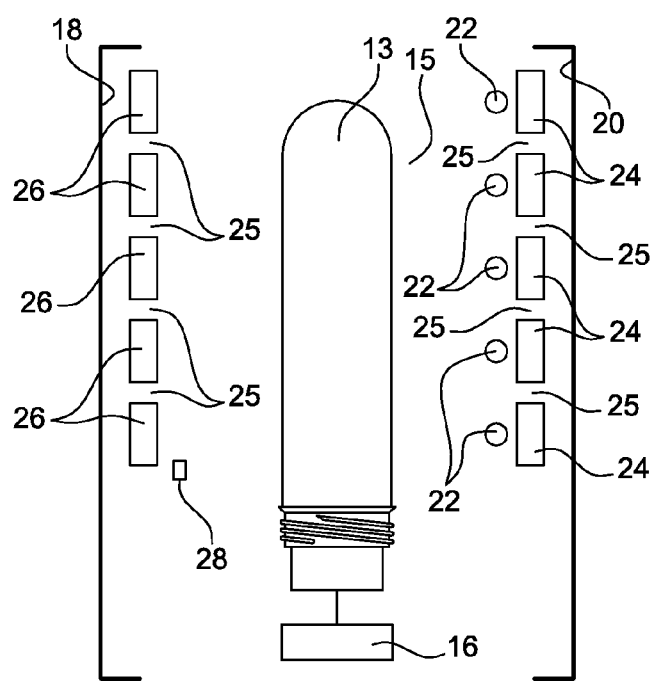
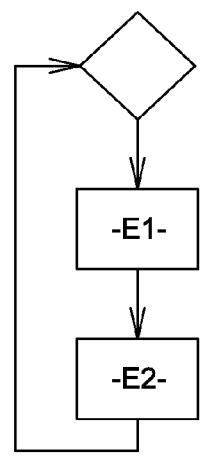

METHOD FOR PLACING AN OVEN FOR HEAT-TREATING PREFORMS ON STANDBY

BACKGROUND OF THE INVENTION

1. Field of the Invention

The invention concerns a method for placing on standby an oven for heat-treating thermoplastic material preforms.

The invention more particularly concerns a method for placing an oven for heat-treating thermoplastic material preforms on standby during a temporary cessation of production, the oven including:
- a device for conveying preforms that moves the preforms through the oven;
- at least one heating lamp that is adapted to emit infrared radiation when it is switched on, each storage element being disposed along the route of the preforms;
- at least one heat-storage element that is made from a material having a high thermal capacity, the storage element being adapted to be heated by the heating lamp;
- an electronic unit for controlling the heating lamps.

2. Description of the Related Art

The manufacture of thermoplastic material containers, such as large or small bottles, etc., is generally effected on the basis of preforms, sometimes called blanks, which are introduced into a molding device with which are associated blowing or drawing-blowing means.

Before they are molded by blowing or drawing-blowing, the preforms are heated in a heat-treatment oven so as to confer on them a structure sufficiently malleable for the blowing operation.

Installations for mass production of such containers are equipped with treatment ovens including a heating tunnel provided with means for heating the preforms. The preforms are generally transported through the heating tunnel at high speed without stopping. The tunnel has a length sufficient to enable heating of the preforms as they pass through.

The preform heating means are generally formed by heating lamps that emit infrared radiation. These lamps traditionally take the form of horizontal tubes that are disposed on a wall of the heating tunnel. Each tunnel section is equipped with a plurality of lamps, which are stacked in order to effect appropriate heating of the whole of the body of the preform.

The wall facing the heating lamps is equipped with ventilation means for agitating the air in order to prevent some areas of the preforms from being overheated by the infrared radiation.

In order for all of the infrared radiation to be used for heating the preform, reflectors are disposed behind the lamps in order to reflect the infrared rays in the direction of the preforms.

Some operating incidents make it obligatory to interrupt production by the installation temporarily. In this case, the oven is no longer fed with preforms. The preforms present in the oven at the time feeding is interrupted finish their travel normally and then exit the oven in the direction of the blowing device. When the last preform is evacuated, the oven no longer contains any preforms.

Some vulnerable parts of the oven are liable to be damaged by a high temperature. These vulnerable parts risk being damaged if the heating lamps remain switched on with no preforms passing through.

Furthermore, it is also preferable for the interior of the oven to be maintained at a temperature sufficient for production to be restarted rapidly, avoiding a long step of restoring the oven temperature.

The oven emptied in this way is then placed on standby. It is known to employ a method of placing the oven on standby during which the intensity of the heating lamps is lowered in order to prevent the vulnerable parts of the oven being overheated and therefore damaged. The ventilation means are furthermore activated in order to evacuate the air heated by the lamps and to cool the vulnerable parts of the oven more effectively.

Such a method consumes a great deal of energy, however. The invention therefore proposes a putting on standby method enabling the consumption of energy to be reduced at the same time as ensuring optimum operation of the treatment oven.

BRIEF SUMMARY OF THE INVENTION

The invention therefore relates to a method of the type described above characterized in that it includes in series:
- a first or switching-off step, which is triggered at the time of a cessation of production and during which the heating lamps are switched off completely;
- and then a second or temperature-maintaining step, which is triggered after the first step and during which the heating lamps are switched on at a intensity determined so as to heat the storage elements.

According to other features of the method:
- the method is repeated from the first step until the oven is returned to production;
- the first step ends at the end of a predetermined first or switching-off duration;
- the second step ends at the end of a predetermined second or switching-on duration;
- the first step ends when the temperature of the storage element is less than or equal to a first or lower threshold temperature;
- the second step continues until the temperature of the storage element is greater than or equal to a second or upper threshold temperature;
- the temperature of the storage element is measured by a probe which is disposed near or in the storage element;
- the oven includes ventilation means that are adapted to be controlled by the electronic control unit, the ventilation means being deactivated during the first step and activated during the second step;
- if the cessation of production exceeds a limit duration, the method is stopped and the heating lamps are switched off completely.

BRIEF DESCRIPTION OF THE DRAWINGS

Other features and advantages of the method will become apparent on reading the following detailed description, to understand which reference should be made to the appended drawing, in which:

FIG. 1 is a plan view that represents diagrammatically a heat-treatment oven that is to be equipped with an installation for mass production of thermoplastic material containers;

FIG. 2 is a view in section taken along the line 2-2 in FIG. 1 which represents a preform travelling in the tunnel of the treatment oven, the tunnel being equipped with heating lamps and reflectors;

FIG. 3 is a block schematic that represents the method for placing on standby the oven produced in accordance with the teachings of the invention.

DETAILED DESCRIPTION OF THE PREFERRED EMBODIMENTS

In the remainder of the description there will be adopted in a non-limiting manner a longitudinal orientation "L" oriented from back to front, a vertical orientation "V" oriented from top to bottom, and a transverse orientation "T" oriented from left to right. These orientations are indicated by the trihedron "L, V, T" in the figures.

In the remainder of the description, elements having analogous, identical or similar functions will be indicated by the same reference numbers.

There is represented in FIG. 1 an installation 10 for mass production of thermoplastic material containers. The installation 10 mainly includes an oven 12 for heat-treatment of preforms 13 and a station 14 for blow-molding the preforms 13 treated in this way, i.e. heated, to form the thermoplastic material containers.

In a known manner, the heat-treatment oven 12 takes the form of a tunnel 15 through which the preforms 13 pass. The preforms 13 are heated as they pass through.

The installation 10 includes a device 16 for transporting preforms 13 through the heat-treatment oven 12 that is adapted to move the preforms 13 one behind the other inside the oven 12. The device 16 for transporting the preforms 13 thus moves the preforms 13 through the oven 12.

The oven 12 includes a plurality of sections. At least one of the sections is provided with heating means. One of these sections equipped with heating means is represented in more detail in FIG. 2.

As represented in FIG. 2, the tunnel 15 is delimited transversely by a vertical interior first wall 18 and a vertical exterior second wall 20. Each preform 13 moves so that its axis is vertical.

In the example represented in FIG. 2, the preform 13 moves in the oven 12 with its neck directed downward. This configuration enables the body of the preform 13 to be heated effectively whilst keeping the neck of the preform relatively cool. To enable homogeneous heating of the body of the preform 13, the latter is mounted on the transport device 16 to rotate about its vertical axis.

The second wall 20 is equipped with means for heating the body of the preforms 13. The heating means are formed by at least one heating lamp 22 that is adapted to emit infrared radiation when it is switched on.

Here the heating means include a plurality of heating lamps 22 that take the form of longitudinal tubes that are carried by the second wall 20. Thus each heating lamp 22 is disposed along the route of the preforms 13. The heating lamps 22 disposed in this way emit infrared radiation in all directions and notably in the direction of the body of the preform 13 to be heated.

The heating lamps 22 are disposed vertically above each other so as to heat all of the body of the preform 13 globally homogeneously.

To make it possible to improve the efficacy of the heating lamps 22, it is known to dispose reflectors 24 between the second wall 20 and each heating lamp 22. The reflectors 24 are conformed so that infrared radiation that is emitted by the heating lamps 22 in the direction of the second wall 20 is reflected in the direction of the body of the preform 13.

Here the reflectors 24 are formed in one piece by a vertical plate pierced with horizontal vents 25. The vents 25 enable the passage of a flow of air as explained hereinafter.

In a nonlimiting manner, to improve further the efficacy of the heating lamps 22, reflectors 26 are also disposed on the first wall 18 so that the infrared rays that cross the tunnel 15 transversely are reflected in the direction of the preform 13. The reflectors 26 on the first wall 18 are produced in the form of a single plate pierced by vents 25. This plate is identical to the plate incorporating the reflectors 24 on the second wall 20.

The oven 12 also includes at least one heat-storage element that is made from a material having a high thermal capacity, the storage element being adapted to be heated by the heating lamps 22.

Here, in the example represented in FIG. 2, the heat-storage elements are formed by the reflectors 24, 26. This advantageously enables two functions to be implemented with the same component in order not to clutter the oven 12.

According to a variant of the invention that is not represented, at least some heat-storage elements do not have a reflector function. They may then be blocks that are disposed vertically between two heating lamps.

The reflectors 24, 26 are made from a material having a high thermal capacity and a low thermal conductivity. Here this means reflectors 24, 26 made from a ceramic material. Accordingly, the reflectors 24, 26 are able to store a large quantity of heat.

By way of nonlimiting example, the ceramic employed to make the reflectors 24, 26 has a thermal conductivity less than $30\ W.m^{-1}.K^{-1}$.

Thus the reflectors 24, 26 form the heat-storage elements. As will be explained in more detail hereinafter, the invention proposes to use this stored heat.

The oven 12 further includes ventilation means (not represented) that enable air to be circulated in the tunnel 15 so as to prevent the preform 13 from being heated non-homogeneously by the infrared radiation emitted by the heating lamps 22.

The ventilation means include for example a fan which blows air transversely through the vents 25 that are produced in the plates incorporating the reflectors 24, 26.

The heating lamps 22 and the ventilation means are controlled by an electronic control unit (not represented). This electronic control unit notably enables switching on or complete switching off of the heating lamps 22 to be commanded. The electronic control unit also enables the intensity of the heating lamps 22 when they are switched on to be controlled.

It happens that operating incidents make it obligatory to interrupt the production of containers. The supply of preforms 13 to the oven is then stopped and the preforms 13 already present in the oven finish their heating cycle before being evacuated from the oven. If these operating incidents can be resolved quickly, for example in less than 30 minutes, it is advantageous not to cool the oven 12 in order to be able to restart production rapidly, without it being necessary to warm up the oven 12.

The invention proposes a method for placing the heat-treatment oven 12 on standby during a temporary cessation of production. Such a method is notably represented in FIG. 3.

When cessation of production is signaled to the electronic control unit, the placing on standby method is triggered. This placing on standby method notably includes:

a first or switching-off step "E1" that is triggered when production is to be halted and during which the heating lamps are switched off completely by the electronic control unit once the oven has been emptied of preforms;

followed by a second or temperature-maintaining step "E2" that is triggered after the first step "E1" and during which the heating lamps are switched on at an intensity determined by the electronic control unit.

During the first step "E1", the presence of the storage elements formed by the reflectors 24, 26 with high thermal capacity makes it possible to switch off the heating lamps 22 completely without the internal temperature of the oven 12 suddenly falling. The heat stored by the reflectors 24, 26 is returned, notably by convection, to the ambient air contained inside the oven 12. Thus the interior of the oven is kept hot to enable faster restarting of production.

During the first step "E1", the electronic control unit also deactivates the ventilation means so as not to cool too quickly the storage elements formed by the reflectors 24, 26. Thus the reflectors 24, 26 are cooled only by natural convection.

By way of nonlimiting example, when the ventilation means are activated, a cooling rate of 100° C. per minute is observed, whereas when the ventilation means are deactivated, the rate of cooling is only 10° C. per minute. During production, the reflectors 24, 26 reach a temperature between 300 and 500° C., for example. Accordingly, when the ventilation means are deactivated, the reflectors 24, 26 remain hot for a long time in relation to a cessation of production of the order of 10 to 20 minutes.

The object of the second step "E2" is to prevent the internal temperature of the oven 12 falling too far after a long interruption of production. Too great a temperature drop would lead to the obligation to warm up the oven 12 on restarting production. The electronic control unit switching on the heating lamps 22 then enables the reflectors 24, 26 to be heated to enable them to store heat again. The heating lamps 22 may be switched on at a moderate intensity, for example 50% of their maximum intensity.

During this second step "E2", the ventilation means are activated by the electronic control unit. The heating lamps 22 then heat the interior of the heating tunnel 15 and there would be the risk of damaging some vulnerable parts, such as metal parts or the means 16 for transporting the preforms 13.

In a first embodiment of the invention, the first step "E1" and the second step "E2" are programmed to last a predetermined duration, for example 5 minutes each. Accordingly, the first step "E1" ends after a predetermined first or switching-off duration "D1" and the second step "E2" ends after a predetermined second or switching-on duration "D2".

The duration "D1", "D2" of each of these two steps "E1" and "E2" is defined by trial and error, for example.

If the interruption of production lasts beyond the planned duration "D2" for the second step "E2", the method is repeated from the end of the second step "E2". Thus the method is repeated until production in the installation 10 is restarted.

In a second embodiment of the invention, the oven 12 is equipped with at least one temperature probe 28 that is adapted to measure the temperature near or in a reflector 24, 26. The temperature measured in this way is transmitted to the electronic control unit.

The second step "E2" is triggered if the measured temperature is less than a first or lower threshold temperature "T1".

Then, if the interruption of production continues, the method is repeated if the measured temperature has become greater than or equal to a second or upper threshold temperature "T2". The second temperature "T2" is higher than the first temperature "T1".

If the duration of the interruption of production exceeds a predetermined duration, for example 30 minutes, the standby method may be terminated and the heating lamps 22 switched off and the ventilation means deactivated until production is restarted. The oven 12 will then have to be warmed up before production can be restarted.

The invention claimed is:

1. A method for placing an oven (12) for heat-treating thermoplastic material preforms (13) on standby during a temporary cessation of production, the oven (12) including:
    a device (16) for conveying the preforms (13) that moves the preforms (13) through the oven (12);
    at least one heating lamp (22) that is adapted to emit infrared radiation when it is switched on, each heating lamp (22) being disposed along the route of the preforms (13);
    at least one heat-storage element (24, 26) that is made from a material having a high thermal capacity, the storage element (24, 26) being adapted to be heated by the heating lamp (22); and
    an electronic unit for controlling the heating lamps (22);
    the method comprising the sequential steps of:
    a switching-off step (E1) of placing the oven in a standby condition for the temporary cessation of production, which switching-off step (E1) is triggered when a cessation of production is determined, and during which switching-off step (E1) the heating lamps (22) are switched off completely; and
    a temperature-maintaining step (E2) of preventing an internal temperature of the oven from falling too far by maintaining the oven at a reduced temperature during the standby condition, the reduced temperature being a temperature sufficient in order to prevent a need for warming up the oven (12) when the oven leaves the standby condition and when restarting production, the temperature-maintaining step (E2) being triggered after the switching-off step (E1), wherein during the temperature-maintaining step (E2), the heating lamps (22) are switched on at an intensity determined so as to heat the storage elements (24, 26) sufficient that the storage elements maintain the oven at the reduced temperature.

2. The method claimed in claim 1, wherein the method is repeated from the switching-off step (E1) until the oven (12) is returned to production.

3. The method claimed in claim 1, wherein the switching-off step (E1) ends after a predetermined first or switching-off duration (D1).

4. The method claimed in claim 3, wherein the temperature-maintaining step (E2) ends after a predetermined second or switching-on duration (D2).

5. The method claimed in claim 1, characterized in that the switching-off step (E1) ends when the temperature of the storage element (24, 26) is less than or equal to a first or lower threshold temperature (T1).

6. The method claimed in claim 5, wherein the temperature-maintaining step continues until the temperature of the storage element (24, 26) is greater than or equal to a second or upper threshold temperature (T2).

7. The method claimed in claim 5, wherein the temperature of the storage element (24, 26) is measured by a probe (28) which is disposed near or in the storage element (24, 26).

8. The method claimed in claim 1, wherein the oven (12) includes ventilation means that are adapted to be controlled by the electronic control unit, the ventilation means being deactivated during the switching-off step (E1) and activated during the temperature-maintaining step (E2).

9. The method claimed in claim 1, wherein when the cessation of production exceeds a limit duration, the method is stopped and the heating lamps (22) are switched off completely.

10. The method claimed in claim 2, wherein the switching-off step (E1) ends after a predetermined first or switching-off duration (D1).

11. The method claimed in claim 2, wherein the switching-off step (E1) ends when the temperature of the storage element (24, 26) is less than or equal to a first or lower threshold temperature (T1).

12. The method claimed in claim 6, wherein the temperature of the storage element (24, 26) is measured by a probe (28) which is disposed near or in the storage element (24, 26).

13. The method of claim 1, wherein, the heating lamps (22) are located along the route of the preforms (13) at locations between the preforms and the storage elements (24, 26) and emit the infrared radiation towards both the preforms and the storage elements (24, 26), and the storage elements (24, 26) are reflectors positioned so that during the production the infrared radiation emitted from the heating lamps in a direction away from the preforms is reflected back by the reflectors in a direction towards the preforms.

14. The method of claim 1, wherein the heating lamps (22) are located along the route of the preforms (13) at locations between the preforms and the storage elements (24, 26) and emit the infrared radiation towards both the preforms and the storage elements (24, 26).

15. The method of claim 1, wherein the storage elements (24, 26) are blocks that are disposed vertically between two adjacent heating lamps.

16. The method of claim 1, wherein the storage elements (24, 26) are comprised of a ceramic material.

17. The method of claim 13, wherein the storage elements (24, 26) are comprised of a ceramic material.

18. The method of claim 14, wherein the storage elements (24, 26) are comprised of a ceramic material.

19. The method of claim 1, wherein the storage elements (24, 26) are comprised of a ceramic material with a thermal conductivity less than 30 $W.m^{-1}.K^{-1}$.

20. The method of claim 1, wherein during the temperature-maintaining step (E2), the heating lamps (22) are switched on at 50% intensity so as to heat the storage elements (24, 26) sufficient that the storage elements maintain the oven at the reduced temperature.

* * * * *